United States Patent [19]
Solle

[11] Patent Number: 5,688,089
[45] Date of Patent: Nov. 18, 1997

[54] FASTENING ELEMENT FOR FITTING INTO A DRILLED HOLE

[75] Inventor: Heinz-Georg Solle, Mutterstadt, Germany

[73] Assignee: BASF Aktiengesellschaft, Ludwigshafen, Germany

[21] Appl. No.: 404,437

[22] Filed: Mar. 15, 1995

[30] Foreign Application Priority Data

Mar. 17, 1994 [DE] Germany .................. 44 09 171.0

[51] Int. Cl.⁶ .................. F16B 13/04; F16B 13/06
[52] U.S. Cl. .................. 411/43; 411/45; 411/77; 411/80; 248/231.9
[58] Field of Search .................. 411/24–26, 43, 411/45, 57, 58, 60, 71–73, 79, 80, 76, 345, 77; 248/231.91

[56] References Cited

U.S. PATENT DOCUMENTS

| | | | |
|---|---|---|---|
| 1,311,038 | 7/1919 | Bowman | 411/77 X |
| 3,215,027 | 11/1965 | Modrey et al. | 411/76 |
| 3,352,193 | 11/1967 | Lerich | 411/80 X |
| 3,911,782 | 10/1975 | Liebig | 411/24 |
| 4,020,735 | 5/1977 | Herback | 411/26 |
| 4,439,079 | 3/1984 | Losada | 411/345 |
| 4,634,326 | 1/1987 | Fischer | 248/231.91 |
| 4,865,501 | 9/1989 | Ferris | 411/345 X |
| 5,059,193 | 10/1991 | Kuslich | 606/61 |
| 5,228,815 | 7/1993 | Gignac et al. | 411/45 |
| 5,484,132 | 1/1996 | George et al. | 248/231.9 |

FOREIGN PATENT DOCUMENTS

| | | | |
|---|---|---|---|
| 1025707 | 2/1978 | Canada | 411/80 |
| 124489 | 11/1984 | European Pat. Off. | |
| 570170 | 11/1993 | European Pat. Off. | |
| 3341266 | 11/1983 | Germany | |
| 121053 | 3/1948 | Sweden | 411/24 |
| 86/06447 | 11/1986 | WIPO | |

*Primary Examiner*—Neill R. Wilson
*Attorney, Agent, or Firm*—Keil & Weinkauf

[57] ABSTRACT

A fastening element for fitting into a drilled hole and a method of fixing a fastening element in a drilled hole are proposed. In the method, an expandable sleeve is fixed in the drilled hole upon drawing of an axially movable anchor, in the direction out of the drilled hole, it being possible for all the elements of the fastening element to consist of plastic.

17 Claims, 6 Drawing Sheets

FIG.2
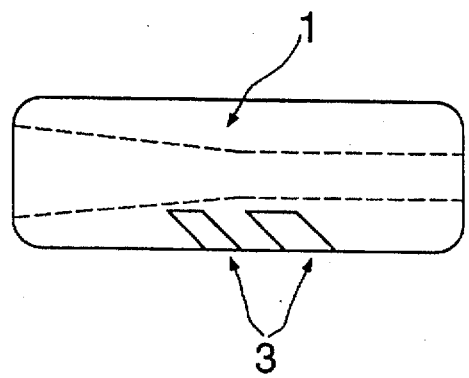
FIG.3
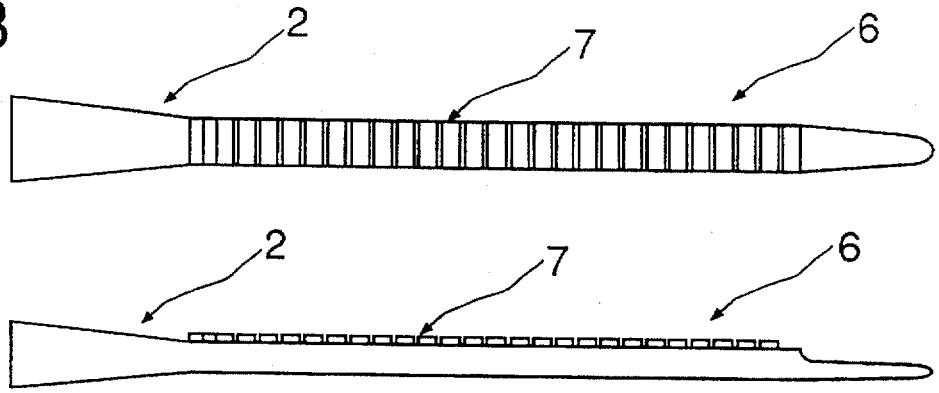
FIG.4

FASTENING ELEMENT FOR FITTING INTO A DRILLED HOLE

BACKGROUND OF THE INVENTION

1. Field of the Invention

The invention relates to a fastening element for fitting into a drilled hole, having a sleeve and an axially movable anchor.

2. Description of the Prior Art

Various forms of riveted joints, screw/nut combinations and screw/dowel combinations have established themselves in particular as fastening means. In practice, the combination of straddling dowel and screw is in widespread use in the construction and hobby sectors because of its good value for money. On the other hand, combinations of screw/bolt and nut, riveted joints and clip connections are preferred in production engineering (vehicle, machine and furniture construction). Plastics are not very suitable here, specifically for use in the case of a fastening element comprising a screw (threaded rod) and nut.

SUMMARY OF THE INVENTION

It is an object of the present invention to specify means for fastening objects one against the other or on a wall. It is preferred if a fastening element and a method of fixing a fastening element are provided particularly such that it is possible to dispense with a metallic connecting pin.

The invention provides a fastening element and a method of fastening a fastening element which, with a suitable design, is distinguished by simple handling, particularly inexpensive production, time saving during installation and weight reduction. In particular, there is created the possibility of replacing metallic components of connecting elements by plastic in areas where plastic was until now excluded, although the fastening element according to the invention may, for example, also be entirely or partly made of metal. The fastening element does without threads, such as are necessary in the screw/nut and screw/dowel combinations for achieving a force fit. In the case of the fastening element according to the invention, fixing of the anchor, which is movable in the sleeve, is performed by suitable means of blocking, which may already be provided in the choice of material of sleeve and anchor. The proposed solution achieves the effect that the hitherto disadvantageous creep behavior of the plastic no longer influences the fastening function. Similarly, the advantages of plastic as a material (high tensile strength) can come to full effect in the case of the proposed fastening element. Furthermore, the fastening element has a particularly high resistance to vibrations. As a result, applications can be found in areas of use which up until now were the preserve of a screwed connection with additional locking, such as checking.

In a first embodiment of the present invention there is provided a fastening element for fitting into a drilled hole, which has:
—an expandable sleeve (1) and
—an axially movable anchor (2), the sleeve inside surface and the anchor outside surface being designed such that the anchor (2), upon its axial relative movement with respect to the sleeve (1) in the direction out of the drilled hole, exerts radial forces on the expandable sleeve (1) in such a way that the sleeve (1) is fixed in the drilled hole.

In a second embodiment there is provided a fastening element like the first embodiment, wherein —the expandable sleeve (1) has an inner section which tapers in the axial direction out of the drilled hole, and
—the axially movable anchor (2) has a drawing means (6) for exerting a tensile force on the anchor in the axial direction out of the drilled hole, the anchor (2), upon its axial movement, exerting radial forces on the expandable sleeve (1) in such a way that the sleeve (1) is fixed in the drilled hole.

In a third embodiment of the fastening element the sleeve (1) has a ribbing on its inside.

In still another embodiment of the fastening element the sleeve (1) has guiding grooves for the anchor on its inside.

In a further embodiment of the fastening element the tapering inner section of the sleeve (1) is conically designed.

In another embodiment of the fastening element the tapering inner section of the sleeve (1) is pyramidally designed.

In one embodiment of the fastening element the sleeve (1) has ribs (3) on its outside.

In one embodiment of the fastening element, which comprises a locking means for fixing the anchor (2).

In one embodiment of the fastening element the locking means is designed as part of the sleeve.

In one embodiment of the fastening element, which comprises a bearing element (5) with locking means for fixing the drawing means (6).

In one embodiment of the fastening element the outside diameter of the bearing element (5) is greater than the diameter of the drilled hole.

In one embodiment of the fastening element the bearing element (5) is designed as a part which is separate from the sleeve (1), preferably can be attached onto an object to be fastened.

In one embodiment of the fastening element, which comprises a drawing means (6), which has on one or more sides means for preventing an axial return movement of the anchor in the direction into the drilled hole.

In one embodiment of the fastening element the drawing means (6) has a texture.

In one embodiment of the fastening element the drawing means (6) has projections, in particular a serration (7).

In one embodiment of the fastening element the drawing means (6) is designed in strip form, at least over one section.

In one embodiment of the fastening element the locking means has one or more tongues pointing substantially in the drawing direction.

In one embodiment of the fastening element the locking means has at least one fixing platelet (8) as a slip preventor.

In one embodiment of the fastening element the locking means is of an unlockable design.

In one embodiment of the fastening element the drawing means (6) is designed for attaching items to the drawing means (6) outside the drilled hole.

In one embodiment of the fastening element the bearing element itself is designed for attaching items to it.

In one embodiment of the fastening element the anchor (2) is designed as a cone, at least over part of its length.

In one embodiment of the fastening element the anchor (2) is pyramidally designed, at least over part of its length.

In one embodiment of the fastening element at least the anchor (2) consists of a limitedly deformable or yielding material.

In one embodiment of the fastening element at least the anchor (2) or the sleeve (1) consists of a thermoplastic material.

In one embodiment of the fastening element at least the anchor (2) or the sleeve (1) consists of an elastomeric material.

In one embodiment of the fastening element the anchor (2) is integrally formed in one piece on the sleeve (1) and designed in such a way that it can be inserted into the sleeve (1) before the fastening operation.

In one embodiment of the fastening element the sleeve (1) receives a second anchor (9) on the side opposite the first anchor (2).

In one embodiment of the fastening element the second anchor (9) has a locking means for fixing the drawing means (6) of the first anchor.

In one embodiment of the fastening element the sleeve (1) has an inner section, tapering toward the center of the sleeve, for receiving the second anchor (9).

In one embodiment of the fastening element the bearing element (5) is designed in such a way that it can be moved relatively to the sleeve (1) upon drawing of the drawing means (6) and, upon the relative movement, exerts compressive forces on the second anchor (9).

In one embodiment of the fastening element the sleeve (1) is of a two-piece design.

In one embodiment of the fastening element the different parts of sleeve (1) are provided with support member (14), especially with webs.

In one embodiment of the fastening element the different parts of sleeve (1) are moved towards each other by drawing the drawing means, objects (12) to be fastened being connected by means of the support member (14).

In one embodiment of the fastening element the second anchor (9) has a drawing means (6) which, upon actuation, exerts a tensile force on the second anchor (9) in the axial direction into the drilled hole, and wherein the drawing means is deflected at the first anchor (2) in the direction out of the drilled hole.

In one embodiment of the fastening element the anchor (2) has a deflecting means (10), at which the drawing means of the second anchor (9) is deflected, the deflecting means (10) and the drawing means of the second anchor being in engagement with each other in such a way that the drawing means exerts on the first anchor (2) a tensile force in the axial direction out of the drilled hole.

In one embodiment of the fastening element the bearing element (5) has a fireproof cladding (11) for protection of the fastening element.

In one embodiment of the fastening element the fireproof cladding (11) consists of refractory material.

In one embodiment of the fastening element a reinforcing element (15) is disposed between the anchor (2) and the fixing means (8).

In one embodiment of the fastening element the fastening element is a cylindrical sleeve, whose end is tapered and suitable to partially extend into the bore and/or to be supported by the outer wall of the bore.

In one embodiment of the fastening element according a distance spacer (16) is provided between the sleeve (1) and the fixing means (8).

In one embodiment of the fastening element the tolerance adjustment element (19) is provided between the distance spacer (16) and the sleeve (1).

In one embodiment of the fastening element the fixing means (8) comprises at least one object fastening means (18), especially a pipe fixing means.

In one embodiment of the fastening element the object fastening means is provided with a height adjustment level.

In one embodiment of the fastening element the height adjustment element comprises a pseudo-eliptically formed element, in which non-concentrically an annular opening is provided.

The invention also provides for a method of fixing a fastening element in a drilled hole, which has the steps:
— fitting of an expandable sleeve (1) and an anchor (2) into a drilled hole;
— axial moving of the anchor (2) relative to the sleeve (1) in the direction out of the drilled hole, the anchor (2) exerting radial forces on the expandable sleeve (1) in such a way that the sleeve (1) is fixed in the drilled hole.

This is preferred, if a fastening element according to the invention is fastened in the drilled hole.

BRIEF DESCRIPTION OF THE DRAWINGS

Further advantages, features and possible applications of the present invention emerge from the following description of exemplary embodiments in conjunction with the drawings, in which:

FIG. 2 shows a sectional representation of the sleeve of one embodiment of the present invention, which has outer ribs (3);

FIG. 3 shows a plan view of an anchor (2) of one embodiment of the present invention, which has an anchor with a wedge-shaped section and a drawing section (6) provided with ribs (7);

FIG. 4 shows a side view of the embodiment according to FIG. 3;

DESCRIPTION OF THE PREFERRED EMBODIMENTS

Figure 1:
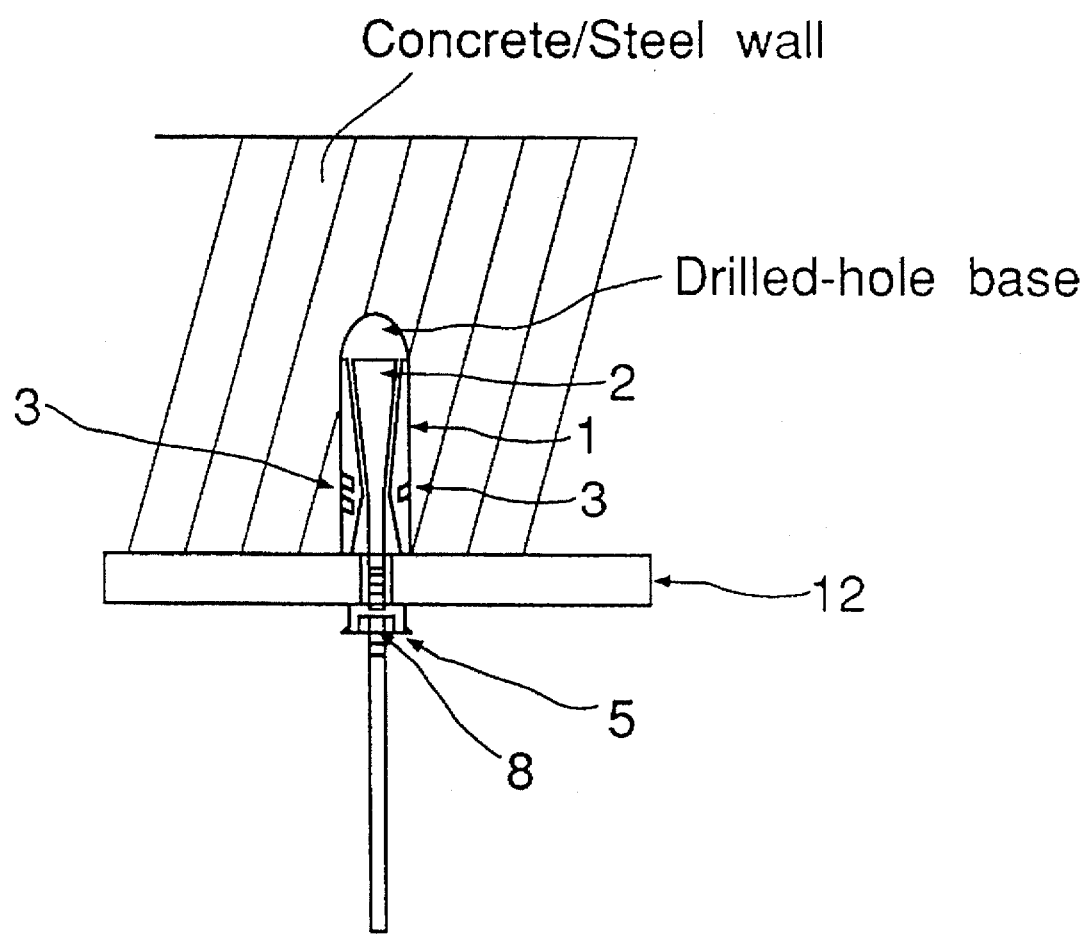
FIG. 1 shows a sectional representation of one embodiment of the fastening element according to the invention, which is fitted in a drilled hole.
Figure 5:
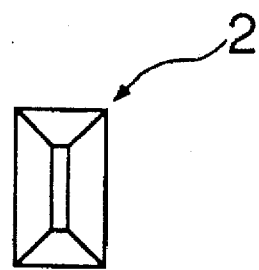
FIG. 5 shows a plan view of the anchor (2) according to the embodiment as shown in FIGS. 3 and 4, which has a pyramidally tapering section and a strip-shaped, ribbed drawing means (6)

In a preferred embodiment, the fastening element has a movable bearing element (5) with locking means. The bearing element (5) receives the preferably strip-formed drawing means (6) of the anchor (2). In the fastening operation, a relative movement takes place between the drawing means (6) and the bearing element (5), an opposed relative movement between bearing element (5) and anchor (2) being prevented by the locking means. This locking means may be designed such that unlocking, i.e. releasing the anchor (2) from the bearing element (5), is possible. As locking means, for example a blocking tongue or a fixing platelet (8) may be designed as a slip preventor, which can be manually unlocked either by a screwdriver slot or by a special type of design, for example of the blocking tongue. In this case, it is advantageous to provide the drawing means (6) with a serration/texture on at least one side. The so-called dead-center lock can also be used, inter alia, as the locking means in the present invention.

The bearing element (5) preferably has a greater diameter than the drilled hole into which the fastening element is being fitted, or than the passage of an object to be fastened. During the fastening operation, upon the relative movement between drawing means (6) and bearing element (5), said object is pressed against the surface in which the drilled hole is located, while at the same time, due to the drawing of the drawing means (6), the anchor (2) is moved axially over a section in the sleeve in the direction out of the drilled hole and, as a result, presses the sleeve (1) against the wall of the drilled hole.

In one embodiment, the anchor (2) is integrally formed on the sleeve (1), for example via a web. Before or during the insertion of the anchor (2) into the sleeve (1), the anchor is bent off or torn off from the sleeve (1), as appropriate.

In a preferred embodiment, the bearing element (5) is designed for attaching objects to the bearing element (5). Bearing elements may be designed such that they receive functional elements, such as hooks, eyes, cover caps, brackets, spacers/suspension fittings and the like and can consequently be coupled to systems. There may also be provided on the bearing element (5) an extension adaptor, in order that an additional anchor (2) can be provided for the coupling according to the invention onto a further sleeve (1) (double lock).

Furthermore, the section of the drawing means (6) projecting out of the drilled hole may be designed for attaching items to the drawing means (6). The drawing means (6) may, for example, have hooks or eyes for attaching objects, such as for example a picture.

In a further embodiment, the sleeve (1) receives a second anchor (9) on the side opposite the first anchor (2). Consequently, the fastening element may be used as a connecting element between two objects, for example two cupboard walls.

In particular, the sleeve of the fastening element can have a support member (14), especially a web. With the help of such two sleeves one opposite to each other as well as a sleeve (1) in a two-part form, objects (12) to be fixed can be connected to each other, a fixing platelet (8) in the form of an anchor being interlocked with the drawing means (6) upon drawing together and thus both sleeves are moved towards each other. In this manner, between the support members of the two sleeves an object to be fixed, for instance two shelves or cupboard walls, can be fixed with the help of this clamping effect.

In an additional embodiment, the second anchor (9) is provided with a drawing means (6) in such a way that the latter is deflected at the first anchor (2), so that the drawing means (6) extends in the direction out of the drilled hole. On actuating the drawing means, forces are then exerted on both anchors, respectively in the direction of the other anchor and they are moved toward each other. The second anchor (9) is preferably used for closing off the drilled hole, in order to protect the fastening element or the drilled hole from external influences. The outside surface of the second anchor (9) is preferably provided with a fireproof cladding (11) of a refractory material. Such materials are known to a person skilled in the art, a preferred option being to use a hydrous glass fiber filled sodium silicate expanding under the effect of heat, commercially available under the name Palusol® (BASF AG).

According to one embodiment of the invention a reinforcing element (15) can be disposed between the anchor (2) and the fixing platelet (8) as well as the fireproof cladding (11) respectively. This reinforcing element (15) serves the purpose to bear forces, which are present perpendicular to the axis of the drawing means (6). By forming the reinforcement element (15) like a cylindrical sleeve, whose one end is tapered and suitable to extend partly into the bore and sleeve (1) respectively, the forces effective to the reinforcement element (15) are transmitted to the inner and/or outer walls of the bore. This development according to the invention wides the spectrum of the use of the fastening element of the present invention to such cases, in which forces are present especially perpendicular to the axis of the drawing means. For example the following cases are mentioned: wash stands to be fixed to a wall, panels, heavy objects hanging on the wall such as pictures, sculptures, tool cupboards, etc. By using the support member also heavy, full-height panels can be fixed spaced apart from the wall without problems. In this manner, the reinforcement element can also serve as a distance spacer.

Another embodiment of the object of the present invention is a fastening element, which has a distance spacer (16) between the sleeve (1) and the fixing platelet (8). This distance spacer (16) can be used in order to ensure the necessary distance for air circulation between wall and panel in the case of full-height panels, to lead pipes along walls or ceilings spaced apart from these, or to fasten cable channels or intermediate ceilings to the ceiling. An advantageous development of the distance spacer of the present invention is that a tolerance adjustment means (19) is provided between the sleeve (1) and the distance spacer (16). This tolerance adjustment means (19) serves the purpose that the provided bores do not have to correspond exactly to the pipe and it is thereby possible that the sleeves, being positioned in the wall, do not necessarily have to be perpendicular to the fixing platelet, that means that they do not have to have a common axis. Therefore, the end of the sleeve (1) adjacent to the distance spacer is formed as a segment of a sphere, the distance spacer itself being formed complementary at the end, adjacent to the sleeve. Thus, an arrangement is formed, drawn together by the drawing means (6) and in general flexible to a degree which allows for the axis of the distance spacer and the axis of the sleeve not having to be parallel.

Further, the fixing platelet (8) to be engaged with the drawing means (6) can be provided with means which are suitable to connect objects to this fixing platelet (8) such as for instance hooks, eyes, pipe fixing means, loops or clawing means.

In a preferred embodiment, the object fastening means is a pipe fixing means, especially in the form of a cable binder, which is equipped with the height adjustment element (17). This height adjustment element (17) can for instance be a pseudo-eliptically formed element, in which a non-concentric, annular opening is provided. This annular opening is formed such that it can receive a pipe, which then changes its distance to the sleeve by turning the pseudo-eliptically formed element. Thereby, mounting is not only made simpler, but the vertical distance relative to the fixed object can be varied by such a formed object fastening means, which comprises such a height adjustment element. In addition, the object fastening means can also result in a noise reducing effect, for instance by not allowing flow noise resulting from the medium inside the pipes to be transmitted to the wall.

The following may be mentioned by way of example as thermoplastic and elastomeric materials which are suitable for producing the fastening element:
polyolefins, preference being given to polyethylene and polypropylene homopolymers or copolymers,
polystyrene homopolymers or copolymers, including ABS, SAN, ASA or HIPS polymers,
polyvinylchlorides, polyamides, polymethylmethacrylates, polyphenylene ethers, polyethersulfones, polyetherketones, saturated and unsaturated polyester resins, LCP polymers, polycarbonates, polyphenylene sulfides, polyoxymethylenes, polyurethanes, in particular thermoplastic polyurethanes.

Similarly, blends of these polymers (mixtures) are suitable, it going without saying that, depending on the application, the polymers may contain customary additives and processing aids such as fibrous or particulate fillers, rubbers, flame-retardant additives, stabilizers or lubricants.

In FIGS. 1 to 8 there is shown a fastening element according to a first exemplary embodiment of the present invention, which is fitted in a drilled hole. The fastening element has an expandable sleeve (1), which tapers from the direction of the drilled-hole base in the direction out of the drilled hole. Before inserting into the drilled hole, the anchor (2) is inserted into the sleeve (1). This anchor has a wedge-shaped section, which is intended for fitting into the tapering inner section of the sleeve. The anchor additionally has a drawing means (6) which projects out of the drilled hole and has ribbing in a certain section. On an object to be fastened, which has a drilled hole, there is set a bearing element (5), which has a locking means.

During the locking operation, the drawing means is drawn in the direction away from the drilled hole and causes a relative movement between bearing element (5) and the anchor (2). As a result, an object (12) to be fastened is pressed against the wall containing the drilled hole. Any sliding back of anchor (2) or bearing element (5) is prevented by the locking means of the bearing element (5), which is in engagement with the ribs of the drawing means (6). By the axial moving of the anchor (2) in the direction out of the drilled hole, a radial force is exerted on the sleeve (1), as a result of which the latter is expanded and is consequently fixed in the drilled hole. The fixing is additionally supported in this exemplary embodiment by outer ribs (3) of the sleeve.

Figure 6:
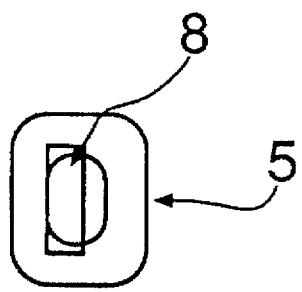
FIG. 6 shows a bearing element (5) with a metallic fixing platelet (8) according to one embodiment of the invention.
Figure 7:
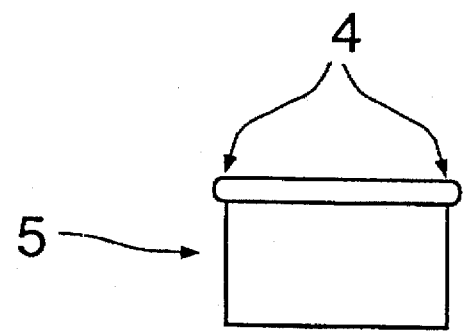
FIG. 7 shows a bearing element (5) with clamping bead (4) of one embodiment of the present invention.
Figure 8:
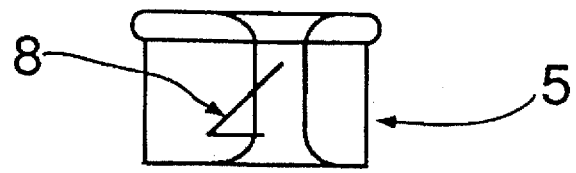
FIG. 8 shows a bearing element (5), which according to one embodiment of the present invention has a passage for the drawing means (6) and a fixing plate (8)

FIGS. 2 to 5 illustrate the design of the expandable sleeve (1) and of the anchor (2). FIG. 6 shows the locking means of the bearing element (5) of this exemplary embodiment. It is a fixing platelet of metal, which serves as a slip preventor for the drawing means (6).

Figure 9:
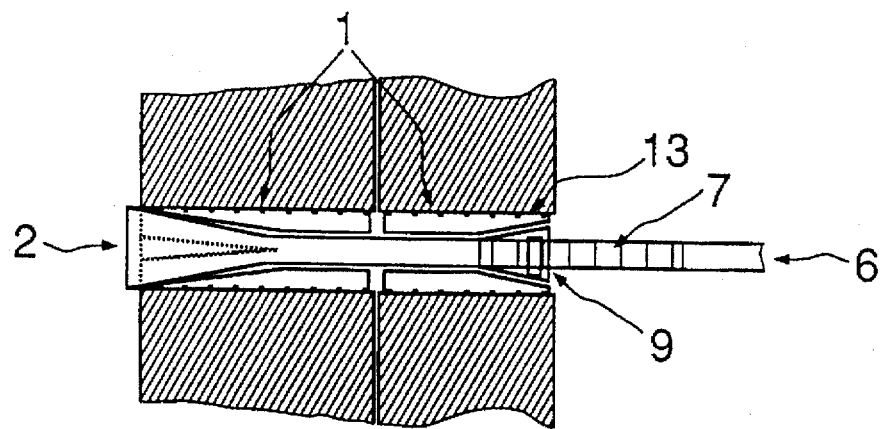
FIG. 9 shows a fastening element according to one embodiment of the present invention, which has two anchors.

A further exemplary embodiment according to FIG. 9 has a sleeve, which has a second inner section, tapering toward the center of the sleeve. The tapering inner sections respectively taper from opposite sides toward the center. The second tapering inner section is intended for receiving a second anchor (9). In contrast to the first anchor (2), the second anchor (9) has no drawing means (6). The sleeve (1) is of a two-piece design and has a fish-scale surface. The two sleeve pieces have been inserted into two objects to be coupled to each other before the objects were joined to each other. The first anchor (2) having the drawing means, can be inserted either together with the sleeve before the joining to each other of the two objects to be coupled or, if the drilled hole is taken through the entire object, can also be inserted after the joining to each other of the objects, either separately or with the sleeve. The fastening then takes place by means of a bearing element (5) (not shown in FIG. 9), which has a locking means. The bearing element (5) is designed such that, upon the relative movement with respect to the drawing means (6) of the first anchor, it forms an abutment for the second anchor (9) and presses the latter, if appropriate, in the direction into the sleeve (1).

Figure 10:
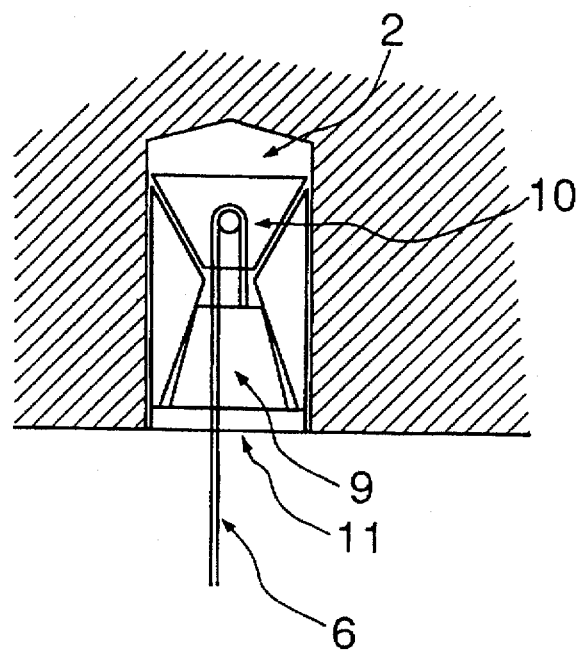
FIG. 10 shows a fastening element according to one embodiment of the present invention, which has two anchors drawn toward each other by a drawing means (6)

FIG. 10 shows a further exemplary embodiment of the fastening element according to the invention, which could, for example, have a practical application as a ceiling suspension fitting. In this case, a one-piece sleeve has two inner sections, tapering toward the center, from opposite sides. The second anchor (9), pointing from the drilled-hole opening in the direction of the sleeve center point, has a drawing means (6), which is deflected at the first anchor (2) in the direction out of the drilled hole. Upon drawing of the drawing means (6), the two anchors (2, 9) are moved toward each other and thereby exert forces in the radial direction on the sleeve. The arresting of the two anchors may in this case take place by means of the design of the surfaces of sleeve and anchor (2, 9) or the choice of materials or by means of a locking of the drawing device (6) in the way already described. In FIG. 10, the second anchor (9) has a fireproof cladding, for example Palusol®, which is intended to protect the fastening element from the effect of heat, which in this way meets the requirements of fire prevention regulations.

Figure 11:
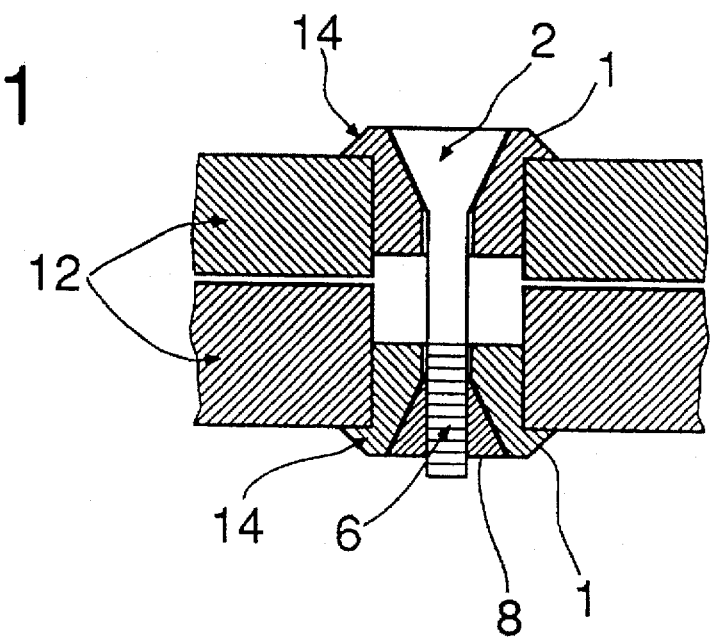
FIG. 11 shows a fastening element according to one embodiment of the present invention, which has two sleeves drawn toward each other by a drawing means (6)

In FIG. 11 it is illustrated how a clamping effect can be achieved with the help of the expandable sleeve in two-part form with a support member (14), with which for instance adjacent cupboard walls, pieces of wood to be subjected to adhesive bonding etc. can be connected to each other. With the help of the support member (14), which has been realized in this embodiment as a web, the sleeves (1) are supporting the object to be fixed and by drawing together the anchors (2) and engaging the drawing means (6) with the fixing platelet (8), the two sleeves (1) are moved towards each other and thus exercise a clamping effect onto the objects to be fixed.

Figure 12:
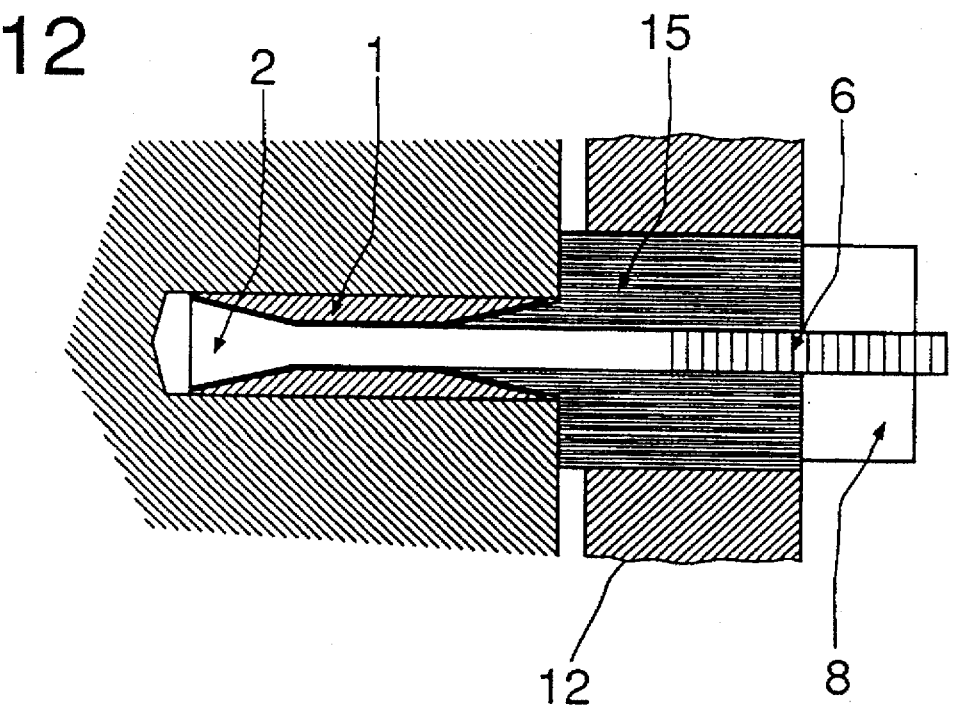
FIG. 12 shows a fastening element according to one embodiment of the present invention, which has additional a reinforcing element (15)

In FIG. 12, another embodiment of the present invention is illustrated, in which a reinforcing element (15) is used. This reinforcing element is formed next to the expandable sleeve or formed separately respectively and is fixed by drawing the drawing means (6) between the fixing platelet (8) and the sleeve (1). This reinforcing element (15) is formed cylindrically, as can be seen from FIG. 12, a conical extension being formed at the end adjacent to the sleeve such that it extends partly into the bore or the sleeve respectively. An object (12) to be fixed can now be mounted onto this reinforcing element (15), the forces present being transferred to the inner wall of the bore, the sleeve or especially to the outer wall respectively by the reinforcing element (15).

Figure 13:
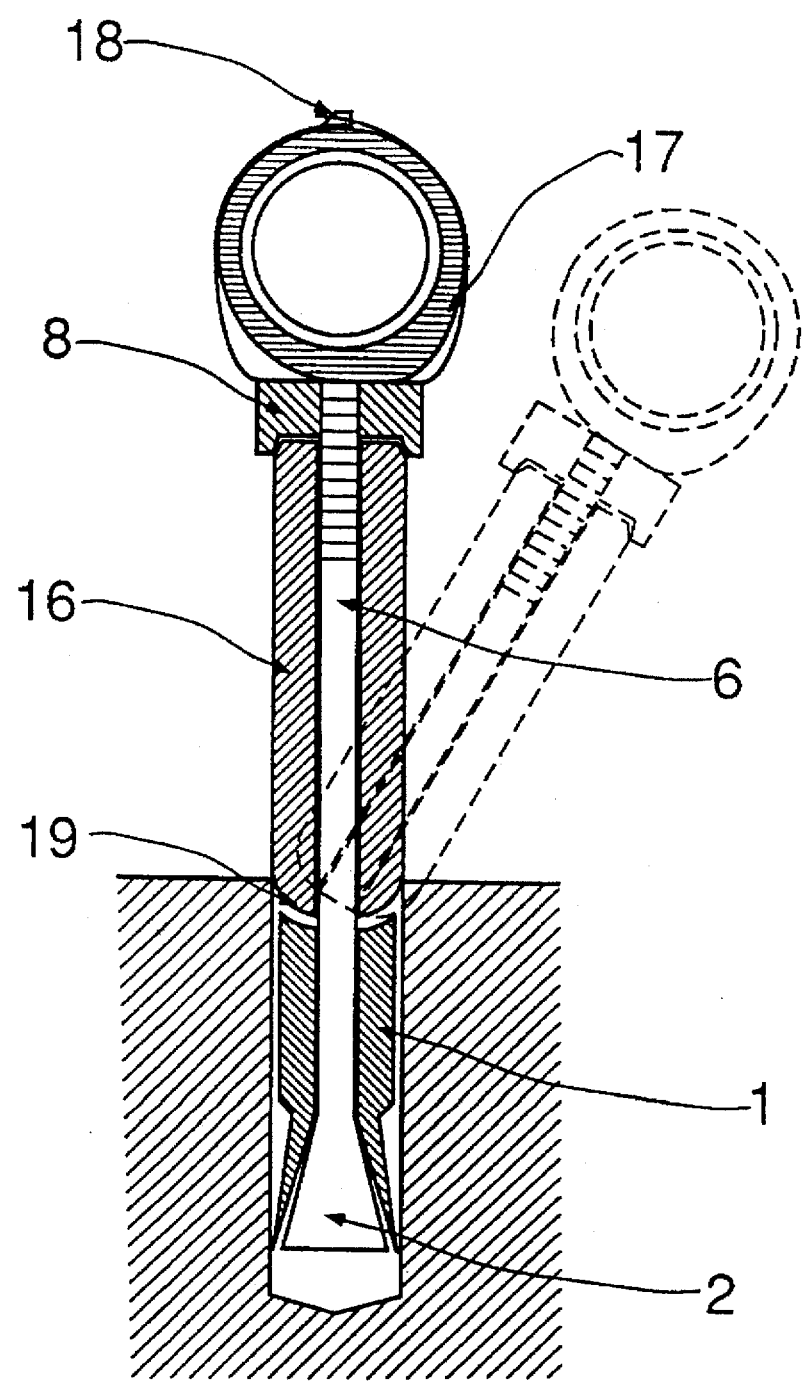
FIG. 13 shows a fastening element according to one embodiment of the present invention, which has a distance spacer (16) and a height adjustment element (17), especially for pipes as well as a tolerance adjustment element (19).

FIG. 13 illustrates another embodiment of the present invention, which has a distance spacer and a height adjustment element. Between sleeve (1) and fixing means (8) a distance spacer (16) is provided, which is connected with the sleeve and the fixing means via the drawing means. Between the distance spacer (16) and the sleeve (1) a tolerance adjustment element (9) is provided, the sleeve being rounded in the upper part, being disposed adjacently to the complementarily rounded part of the distance spacer (16) and thus allowing for the tolerance adjustment element of the distance spacer to be bent in the position indicated by the dotted line. A tolerance adjustement element, bend to the position indicated by dotted lines does not exercise any permanent restoring forces, espcecially not onto the pipe to be fixed. An object fastening means, especially a cable binder, is attached to the fixing means (8). A height adjustment element (17) has been integrated into the object fastening means (18). The height adjustment element (17) is built elliptically and allows to vary the distance between pipe and wall by turning. Further, the height adjustment element (17) is provided with sound absorbing material.

What is claimed is:

1. A fastening element for fitting into a drilled hole, which has:

an expandable sleeve (1) and an axially movable anchor (2), the sleeve inside surface and the anchor outside surface being designed such that the anchor (2), upon its axial relative movement with respect to the sleeve (1) in the direction out of the drilled hole, exerts radial forces on the expandable sleeve (1) in such a way that the sleeve (1) is fixed in the drilled hole;

a flexible drawing means (6), which is receivable in a bearing element (5) with locking means for fixing the drawing means (6) which has on one or more sides means for preventing an axial return movement of the anchor in the direction into the drilled hole.

2. The fastening element of claim 1, wherein the bearing element (5) has a fireproof cladding (11).

3. The fastening element of claim 1, wherein the drawing means (6) is designed in strip form, at least over one section.

4. The fastening element of claim 1, wherein the drawing means (6) has a texture.

5. The fastening element of claim 1, wherein the drawing means (6) is designed for attaching items to the drawing means (6) outside the drilled hole.

6. The fastening element of claim 1, wherein the anchor (2) is integrally formed in one piece on the sleeve (1) and designed in such a way that it can be inserted into the sleeve (1) before the fastening operation.

7. The fastening element of claim 1, wherein the sleeve (1) receives a second anchor (9) on the side opposite the first anchor (2), the second anchor (9) having a locking means for fixing a drawing means (6) of the first anchor.

8. The fastening element of claim 1, wherein the sleeve (1) is of a two-piece-design.

9. The fastening element of claim 8, wherein the different parts of sleeve (1) are provided with support member (14).

10. The fastening element of claim 9, wherein the different parts of sleeve (1) are moved towards each other by drawing the drawing means, objects (12) to be fastened being connected by means of the support member (14).

11. The fastening element of claim 7, wherein the second anchor (9) has a drawing means (6) which, upon actuation, exerts a tensile force on the second anchor (9) in the axial direction into the drilled hole, and wherein the drawing means (6) is deflected at the first anchor (2) in the direction out of the drilled hole.

12. The fastening element of claim 7, wherein the first anchor (2) has a deflecting means (10), at which the drawing means of the second anchor (9) is deflected, the deflecting means (10) and the drawing means of the second anchor being in engagement with each other in such a way that the drawing means exerts on the first anchor (2) a tensile force in the axial direction out of the drilled hole.

13. The fastening element of claim 1, wherein a tolerance adjustment element (19) is provided between a distance spacer (16) and the sleeve (1).

14. The fastening element of claim 1, wherein the fixing means (8) comprises object fastening means (18).

15. The fastening element of claim 14, wherein the object fastening means being provided with a height adjustment means, the height adjustment level comprising a pseudo-elliptically formed element, in which non-concentrically an annular opening is provided.

16. The fastening element of claim 1, comprising a limitedly deformable or yielding material.

17. The fastening element of claim 14, wherein the object fastening means (18) is a pipe fixing means.

* * * * *